United States Patent
Erikawa et al.

(10) Patent No.: US 6,525,736 B1
(45) Date of Patent: Feb. 25, 2003

(54) METHOD FOR MOVING GROUPED CHARACTERS, RECORDING MEDIUM AND GAME DEVICE

(75) Inventors: Yoichi Erikawa, Yokohama (JP); Junpei Tsuda, Yokohama (JP)

(73) Assignee: Koei Co., LTD, Kanagawa (JP)

( * ) Notice: Subject to any disclaimer, the term of this patent is extended or adjusted under 35 U.S.C. 154(b) by 301 days.

(21) Appl. No.: 09/631,993

(22) Filed: Aug. 3, 2000

(30) Foreign Application Priority Data

Aug. 20, 1999 (JP) .......................................... 11-233595

(51) Int. Cl.$^7$ .............................................. G06T 15/00
(52) U.S. Cl. ....................................................... 345/473
(58) Field of Search ................................ 345/473, 474, 345/475, 618, 619, 629

(56) References Cited

FOREIGN PATENT DOCUMENTS

| JP | 7-244743 | 9/1995 |
| JP | 8-63613 | 3/1996 |

OTHER PUBLICATIONS

Reynolds, Flocks, Herds, and Schools: A Distributed Behavioral Model, ACM Computer Graphics vol. 21, No. 4, Jul. 1987.*

Wilhelms, Jane et al., *Dynamic Animation: Interaction and Control*, The Visual Computer, pp. 283–295, Apr., 1988.

Foley, James D. et al., *Computer Graphics*, pp. 488–491, Published by Addison Wesley Publishing Co., Inc., 1990.

* cited by examiner

*Primary Examiner*—Phu K. Nguyen
(74) *Attorney, Agent, or Firm*—Nixon Peabody LLP; Thomas W. Cole

(57) ABSTRACT

The present invention is to provide a method for moving grouped characters whose interaction can be expressed realistically. When an acceleration for moving a character away from anther character when the another character exists within a short distance region of the character, an acceleration for matching the character with speed and direction of another character moving as so to follow a leader when the another character exists within a middle distance region, and an acceleration for moving the character away from another character when the another character exists within a long distance region are calculated (steps 308 to 312), and a position of the character on a three-dimensional virtual space is calculated on the basis of summed acceleration obtained by sing the calculated accelerations for each of components x, y, z on the three-dimensional virtual (steps 314, 316). Since each character can move while changing its speed and direction according to motion of other characters, motion of each character can be expressed realistically.

20 Claims, 14 Drawing Sheets

Fig. 11

| CORPS CHARACTERISTICS | | | | | |
|---|---|---|---|---|---|
| SHORT DISTANCE PERCEPTION ANGLE | 190 | deg. | MIDDLE DISTANCE PERCEPTION ANGLE | 170 | deg. |
| SHORT DISTANCE PERCEPTION RADIUS | 3 | m | MIDDLE DISTANCE PERCEPTION RADIUS | 7 | m |
| SHORT DISTANCE MAX REPULSIVE FORCE | 350 | m/sec2 | | | |
| | | | MAXIMUM VELOCITY | 19.399999618530 | m/sec |
| LONG DISTANCE PERCEPTION ANGLE | 30 | deg. | MAXIMUM ACCELERATION | 35 | m/sec2 |
| LONG DISTANCE PERCEPTION RADIUS | 15 | m | VELOCITY-EQUALIZING TIME PARAMETER | 0.3000000119209 | sec |
| LONG DISTANCE MAX REPULSIVE FORCE | 3 | m/sec2 | WANDERING TIME VELOCITY | 7 | m/sec |

801, 802, 803, 804, OK, CANCEL

Fig. 12

TARGET POINT FALLING-IN ORDER

LEADER'S ORIENTATION  90  deg.

OK  CANCEL

METHOD FOR MOVING GROUPED CHARACTERS, RECORDING MEDIUM AND GAME DEVICE

BACKGROUND OF THE INVENTION

1. Field of the Invention

The present invention relates to a method for moving grouped characters, a recording medium and a game device, and in particular relates to a method for moving grouped characters where a plurality of characters which are displayed on a three-dimensional virtual space and in which a leader is included form a group and the grouped characters are moved towards a predetermined target point, a recording medium on which the method is recorded, and a game device which is called at a predetermined period where a software which is read from a recording medium by operating an inputting section can be loaded to a storing section, and which is provided with a position calculating section for calculating a position of each character of a group of characters which is moved to a predetermined target point, the group being formed with a plurality of characters including a leader.

2. Description of the Related Art

Nowadays, various kinds of game software are recorded on recording media such as CD-ROMs or the like and are being marketed from respective companies in the game industry. Such recording media are used by inserting into game devices. As shown in FIG. 1, the most popular home-use game device 10 among the game devices is structured by connecting an inputting device 3 such as a controller pad shown in FIG. 2 and a television monitor 4 to a main body 2 of the game device. When a player inserts a recording medium 1 into the main body 2 of the game device, a game program which is recorded on the recording medium 1 is loaded to a RAM which is a storing memory of the main body 2 of the game device automatically or by pushing down a predetermined button on the inputting device 3, and a game starts off. Then, the player can enjoy the game by operating various buttons on the inputting device 3.

By the way, games where five or so (a plurality of) characters are moved mainly on 2-dimensionally expressed coordinates while they are forming a rank are marketed as the conventional games. For example, Japanese Patent Application Laid-open (JP-A) No. 8-63613 discloses a technique that gives each fellow character which follows a hero character as a leader of the rank variety of motions matched with the personality of each fellow character by setting in advance an inherent moving speed, and a timing or a probability of changing a direction defined for each fellow character.

According to this technique, when a position on which each fellow character is to be actually displayed is set as a target position, a vector sum of a reference position which is determined according to a locus on which the hero character traces and on which the fellow character is fundamentally traces, and a relative position showing an offset to the fundamental position, is computed to obtain the target position of the fellow character. When there is an obstacle at the target position, the target position is set back to the last value, and the relative position is determined such that the target position takes the last value, so that the fellow character is brought to a short halt. Accordingly, each fellow character following the hero character is moving to the target position where other preceding fellow characters moving ahead of the fellow character do not occupy.

Incidentally, as a technique relevant to the present invention, there is a paper regarding equations of motion according to Euler method, entitled "Dynamic animation: interaction and control" (Jane Wilhelms, Matthew Moore, and Robert Skinner) in "2.2 Numerical integration methods", pp. 283-295, "The Visual Computer" published in April, 1988.

However, the technique disclosed in the above JP-A No. 8-63613, since the predetermined moving speed and the predetermined timing/probability of changing the direction are not changed in accordance with a situation in which the fellow characters are moving, the respective fellow characters are displayed so as to follow the movement of the hero character and they can not move while displaying their delicate reciprocal interactions among them. That is, in a group (troop, flock, flight, herd, pack, swarm, school, etc.) of animals such as actual birds, horses or the like, since birds or horses positioned in the middle to the rear portion of the group are not moving with observing the movement of a leader, but are moving with adjusting their speeds or directions so as to correspond to the movement of the birds or horses moving around them. Therefore, the technique described in the above Laid-open has a problem that a moving state of the group of actual animals can not be expressed with a sense of reality.

SUMMARY OF THE INVENTION

In view of the above facts, an object of the present invention is to provide a method for moving grouped characters whose interaction can be expressed realistically, a recording medium thereof, and a game device.

In order to solve the above problem, a first aspect of the present invention is a method for moving grouped characters where a plurality of characters which are displayed on a three-dimensional virtual space and in which a leader is included form a group and the grouped characters are moved towards a predetermined target point, comprising the steps of: calculating a first acceleration for moving a character away from another character when the another character exists within a predetermined first region for the character, and a second acceleration for matching the character with moving speed and direction of another character which is moving so as to follow the leader when the another character exists within a predetermined second region for the character, respectively; and calculating a position of the character on the three-dimensional virtual space on the basis of summed acceleration obtained by summing the calculated first and second accelerations for each of x, y and z components on the three-dimensional virtual space within a predetermined-time.

In the aspect of the present invention, since the character is moved to the target position by the acceleration where the first acceleration for moving the character away from another when the another character exists within the predetermined first region and the second acceleration for matching the character with the moving speed and direction of another character which is moving so as to follow the leader when the another character exists within the predetermined second region are summed for each of x, y and z components on the three-dimensional virtual space, the character moves while changing its speed and direction in accordance with the moving situation of other characters in the first and second regions. Accordingly, action of movement of the character can be displayed with a reality.

In this aspect, in a case in which the first and second regions are spheres or circles defined by predetermined vertical angles or predetermined radii centering the character, and the vertical angle for the first region is made larger than that for the second region and the radius for the former is made smaller than that for the latter, a view (sight) similar to an animal's view in the natural world can be given to the character, so that action of the movement of each character can be displayed in Imitation of an animal in the natural world.

Further, by calculating a third acceleration for moving the character away from another character when the another character exists within a predetermined third region for the character, and by calculating the position of the character on the three-dimensional virtual space on the basis of summed acceleration obtained by summing the calculated first to third accelerations for each of x, y and z components on the three-dimensional virtual space within the predetermined time, the character moves while changing its speed and direction in accordance with the moving situation of the other characters existing within the first to third regions, the action of movement of each character can be displayed in a more real manner. In this case, when the first to third regions are spheres or circles defined by predetermined vertical angles or predetermined radii centering the character, the vertical angle for the first region is made larger than that for the second region and the vertical angle for the second region is made larger than that for the third region, and the radius for the first region is made smaller than that for the second and the radius for the second region is made smaller than that for the third region, the view similar to the animal's view in the natural world can be given elaborately to each character, so that the action of the movement of each character can be displayed precisely in imitation of the animal in the natural world. Furthermore, in a case that the first acceleration is changed so as to increase sharply when a distance between the character and another character is small and the third acceleration is changed at a constant rate when the distance between the character and the another character is small, the character tries to move away from the another character with large acceleration when it approaches the another character, and the character tries to avoid another remote character with small acceleration when the another remote character exists, so that the character can be caused to behave like movement (motion) of each animal of a troop or group of animals in the natural world.

Moreover, when the first aspect is structured so as to further include a wandering step where, after the group reached the target point, the character wanders about within a predetermined region at a predetermined velocity on the basis of predetermined information, a state in which animals in the troop in the natural world are crowded together can be displayed. In this time, in a case that the character moves towards a reference point which is arbitrarily set within the predetermined region at a velocity larger than the predetermined velocity until the character returns within the predetermined region when the character moves outside the predetermined region, behavior of the animal in the natural world trying to return to his/her troop when he/she has separated from the troop can be displayed in a real manner. When the first aspect is structured so as to further include an agglutinated state canceling step where, when an agglutinated state in which a character agglutinates another character so that it can not move is generated, an advancing direction of the character is changed so as to cancel the agglutinated state, the character which can not move due to the agglutinated state is prevented from being generated so that a player can be prevented from getting tired of a game, and behavior of the animal in the natural world who can not move backward can be reproduced.

A second aspect of the present invention is a computer-readable recording medium on which the method for moving grouped characters of the first aspect is recorded. And, a third aspect of the present invention is a game device, where a software which is read from a recording medium by operating an inputting section can be loaded to a storing section, and which is provided with a position calculating section, which is called at a predetermined period, for calculating a position of each character of a group of characters which is moved to a predetermined target point, the group being formed with a plurality of characters including a leader, wherein the position calculating section comprises: a first acceleration calculator for calculating a first acceleration for moving the character away from another character when the another character exists within a predetermined first region for the character; a second acceleration calculator for calculating a second acceleration for matching the character with moving speed and direction of another character which is moving so as to follow the leader when the another character exists within a predetermined second region for the character; and a position calculator for calculating a position of the character on a three-dimensional virtual space on the basis of summed acceleration obtained by summing the accelerations calculated by the first and second acceleration calculator for each of x, y and z components on the three-dimensional virtual space.

BRIEF DESCRIPTION OF THE DRAWINGS

FIG. 11 is a dialog screen of corps characteristics information displayed on the television monitor;

FIG. 12 is a dialog screen of target point falling-in order information displayed on the television monitor;

FIGS. 15A, 15B and 15C show the cavalry soldier corps at a falling-in time, the cavalry soldier corps after a predetermined time has elapsed from the state shown in FIG. 15A, and the cavalry soldier corps after a predetermined time has further elapsed from the state shown in FIG. 15B, respectively;

FIGS. 16A, 16B and 16C show the cavalry soldier corps at a falling-in time, the cavalry soldier corps after a predetermined time has elapsed from the state shown in FIG. 16A, and the cavalry soldier corps after a predetermined time has further elapsed from the state shown in FIG. 16B, respectively;

FIG. 18A shows a state in which the cavalry soldiers are positioned inside a wandering circle and FIG. 18B shows a state in which one of the cavalry soldiers is positioned outside the wandering circle; FIG. 19A shows a case that a repulsive force is applied to both cavalry soldiers from their fronts and FIG. 19B shows a case that the agglutinated state is cancelled.

DETAILED DESCRIPTION OF THE PREFERRED EMBODIMENTS

An embodiment of a video game device to which the present invention is applied will be described hereinafter with reference to the drawings. In the embodiment, a case is assumed that a group of characters is a cavalry soldier corps consisting of cavalry soldiers, the cavalry soldiers are caused to fall in at a predetermined position, and they are moved towards a target point where they are caused to fall in.

Structure

Figure 1:
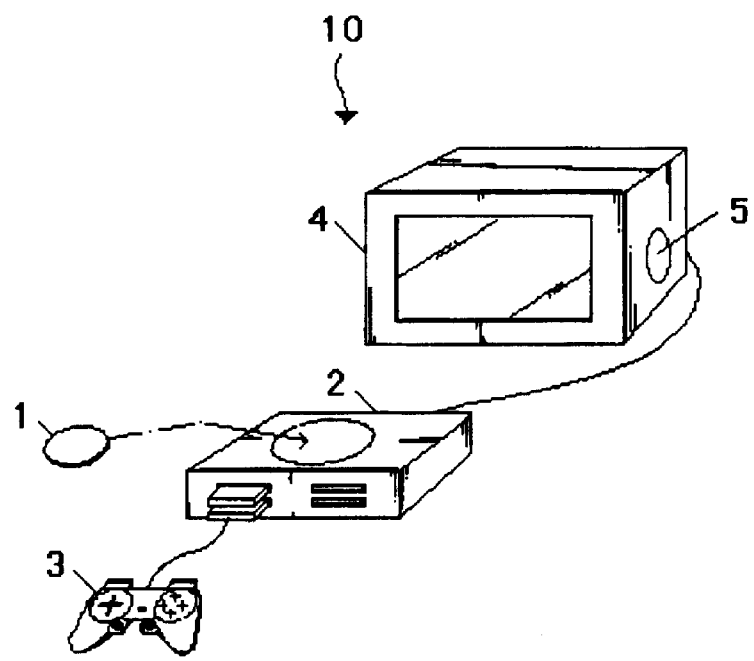
FIG. 1 is a schematic perspective view showing a connected state of a home-use game device.
Figure 2:
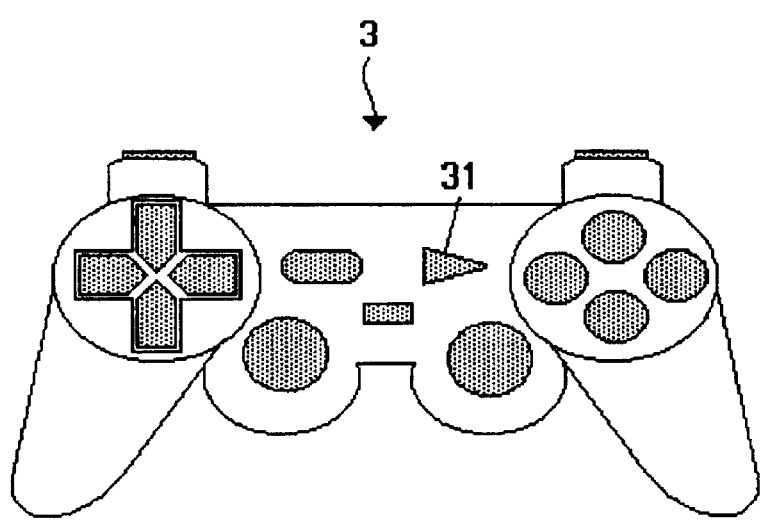
FIG. 2 is a plan view of an inputting device used for the home-use game device.
Figure 3:
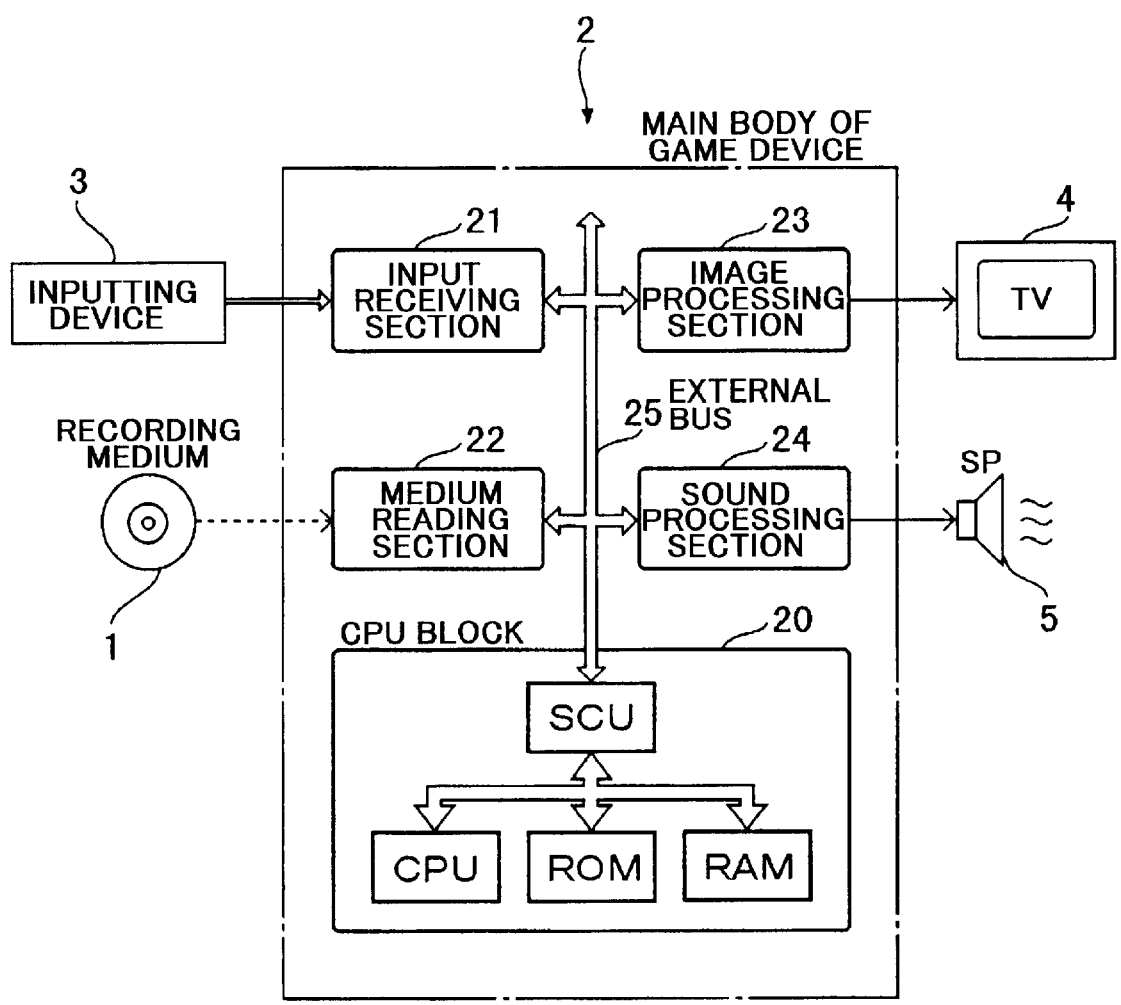
FIG. 3 is a schematic block diagram showing a structure of a main body of the game device of an embodiment to which the present invention is applied.

As shown in FIG. 3, a main body 2 of a game device is provided with a CPU block 20, serving as first to third acceleration calculators and a position calculator, which controls the entire device. The CPU block 20 comprises a SCU (System Control Unit) for mainly controlling data transmission among respective sections in the main body 2 of the game device, a CPU operated with a high speed clock as a central processing unit, a ROM in which a basic operation controlling program of the main body 2 of the game device is stored, a RAM which is operated as a work area for the CPU and to which a game program recorded on a recording medium 1 is temporarily stored, and a bus connecting these sections.

The SCU 20 is connected to an external bus 25. The external bus 25 is connected to an input receiving section 21 which receives an input from an inputting device 3 such as a control pad or the like to transmit input information to the CPU block 20, a medium reading section 22 such as a CD-ROM drive or the like, which is provided with a CPU (not shown) and which reads the game program recorded on the recording medium 1 to transmit the same to the CPU block 20, an image processing section 23 which is provided with a VRAM (not shown) and which produces image information in accordance with information transmitted from the CPU block 20, and a sound processing section 24 which is provided with a sub-CPU (not shown) and which processes sound such as, for example, footsteps of the cavalry soldier corps or the like. Also, the input receiving section 21, the image processing section 23 and the sound processing section 24 are respectively connected to the inputting device 3, a television monitor 4 and a speaker 5.

Operation

Figure 4:
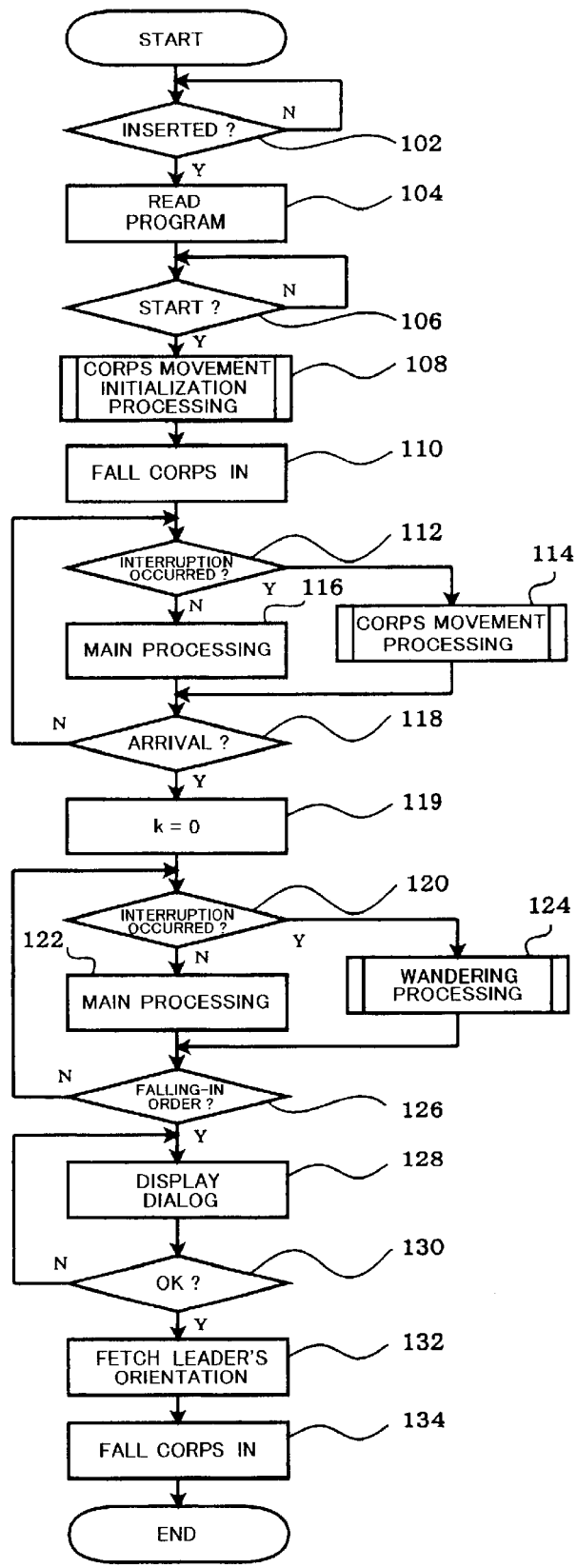
FIG. 4 is a flowchart showing a cavalry soldier corps movement routine of the embodiment.

Next, operation of the present embodiment will be explained with reference to flowcharts. Incidentally, a power supply is connected to the main body 2. When a power switch (not shown) for putting the main body 2 in an operated state is pressed, execution of a cavalry soldier corps movement routine shown in FIG. 4 is started off.

In the cavalry soldier corps movement routine, first, in step 102, a standby state is maintained until the recording medium 1 is inserted into the medium reading section 22 and the game program is made readable. When the program is ready to be read, the routine proceeds to step 104 where the game program is read by the medium reading section 22 and the read game program is transmitted to the RAM. In subsequent step 106, a standby state is maintained until a starting button 31 on the inputting device 3 is pressed down. When the start button 31 is pushed, a corps movement initialization processing subroutine for performing an initialization for moving a cavalry soldier corps to a target point in subsequent step 108 is executed.

Figure 5:
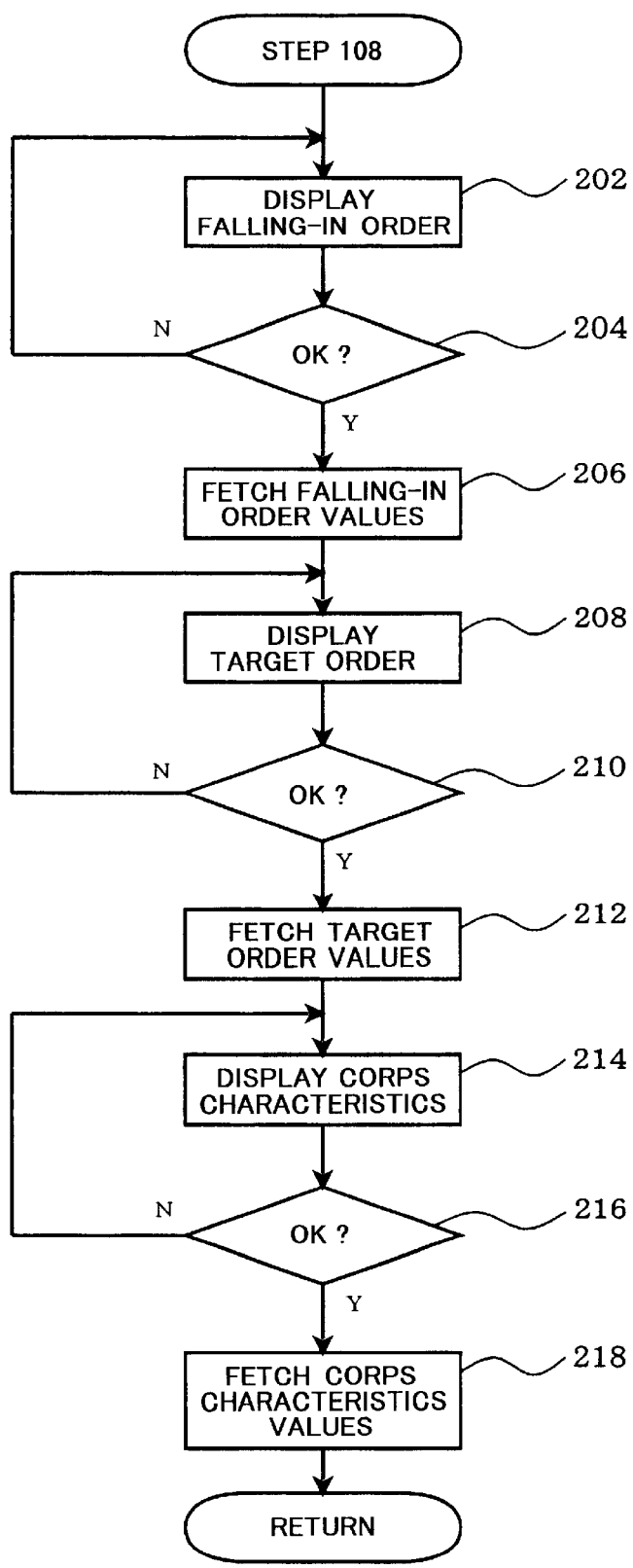
FIG. 5 is a flowchart of a corps movement initialization processing subroutine showing the details of step 108 of the cavalry soldier corps movement routine.
Figure 9:
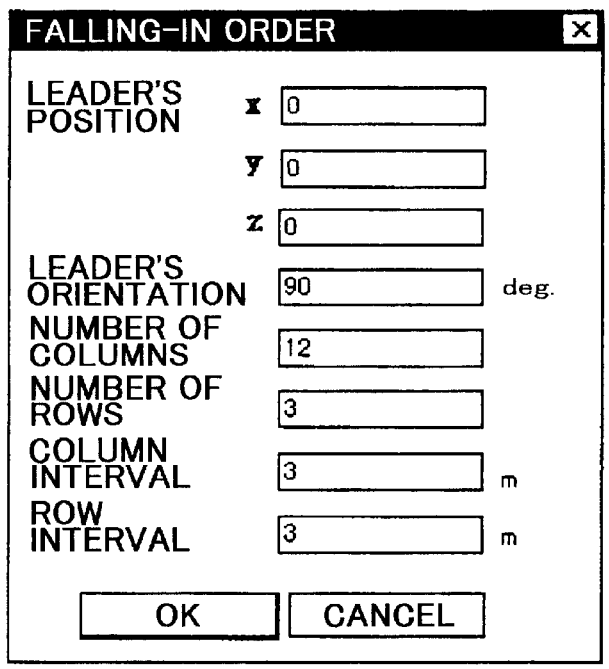
FIG. 9 is a dialog screen of falling-in order information displayed on a television monitor.
Figure 15A:
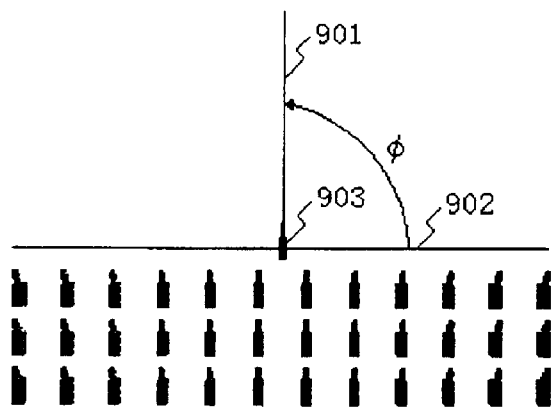
FIGS. 15A, 15B and 15C are respectively explanatory diagrams showing movement states of the cavalry soldier corps displayed on the television monitor, where

As shown in FIG. 5, in the corps movement initialization processing subroutine, first, in step 202, falling-in order information for falling the cavalry soldier corps in at a falling-in point is displayed on the television monitor 4. In the falling-in order information display, default values which was stored in the RAM in step 104 are displayed in a dialog form, as shown in FIG. 9. Incidentally, as shown in FIG. 15A, "LEADER'S POSITION" in FIG. 9 shows a position of a corps leader (hereinafter, referred to as a leader) 903 of the cavalry soldier corps on a virtual space, and "LEADER'S ORIENTATION" shows an angle φ of the leader towards a forward direction from a horizontal line 902 on the virtual space, "NUMBER OF COLUMN" and "NUMBER OF ROW" show the number of columns and the number of rows when the cavalry soldiers of the cavalry soldier corps fall in except for the leader, and "COLUMN INTERVAL" and "ROW INTERVAL" show intervals or spaces between columns of the cavalry soldiers and between rows thereof on a three-dimensional virtual space. Accordingly, a player can change the default values according to his/her preference by operating the inputting device 3. Also, when a predetermined button corresponding to "CANCEL" shown in FIG. 9 is operated on the input device 3, all of the changed values are set back to the default values (hereinafter, the same in FIGS. 10 to 12). In this embodiment, the leader is automatically set, but it may be designated by the inputting device 3. In subsequent step 204, a standby state is maintained until a predetermined button on the inputting device 3 for pushing down "OK" button shown in FIG. 9 is operated, and when the predetermined button is operated, the falling-in order values of the falling-in order information are fetched and stored in the RAM in step.206.

Figure 10:
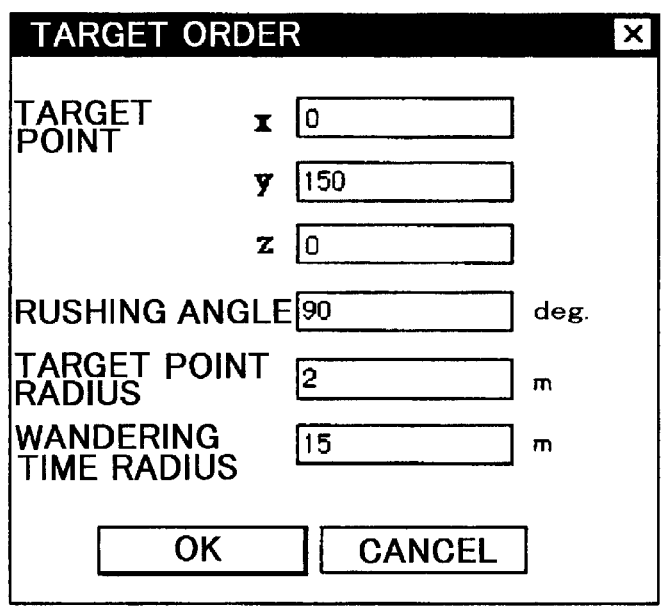
FIG. 10 is a dialog screen of target order information displayed on the television monitor.
Figure 17:
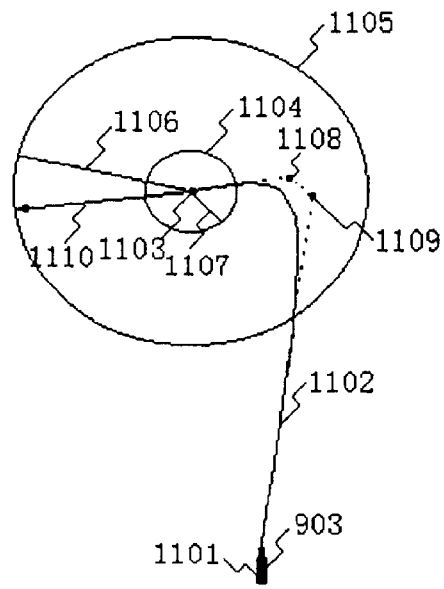
FIG. 17 is an explanatory diagram for explaining a locus on which a leader of the cavalry soldier corps traces.

Next, in step 208, target order information which is information on an arriving target position of the cavalry soldier corps is displayed on the television monitor 4. The display of the target order information is performed by displaying default values which was stored in the RAM in step 104 in a dialog form, as shown in FIG. 10. Incidentally, as shown in FIG. 17, "TARGET POINT" shows a position of an arriving target point 1103 of the cavalry soldier corps on the virtual space, "RUSHING ANGLE" shows an angle at which the leader rushes into the target point when an advancing direction from the falling-in position is set to 0°, "TARGET POINT RADIUS" which shows a radius 1107 from the target point and which is set in order to determine that the leader has reached the target point when the leader reaches the scope of a circle (sphere) having this radius, and "WANDERING TIME RADIUS" which shows a radius 1106 from the target point and which is set in order to cause the cavalry soldiers of the cavalry soldier corps to wander about within a circle defined by the radius 1106 after the cavalry soldier corps reached the target point. In subsequent step 210, a standby state is maintained until a predetermined button operation (pushing-down of OK button) is performed. When the predetermined button is operated, the target order values of the target order information are fetched and stored in the RAM in step 212.

Next, in step 214, corps characteristics information which includes characteristics of the cavalry soldier corps is displayed on the television monitor 4. As shown in FIG. 11, the corps characteristic information is displayed in a dialog form as default values which was stored in the RAM in step 104, and it can be changed. Incidentally, the meanings about "SHORT DISTANCE PERCEPTION ANGLE" and the like shown in FIG. 11 are described later. In subsequent step 216, a standby state is maintained until a predetermined button operation is performed. When the predetermined button is operated, the values of the corps characteristics information are fetched and stored in the RAM in step 218, and the corps movement initialization processing subroutine ends and the routine advances to step 110 in FIG. 4.

In step 110, as shown in FIG. 15A, the cavalry soldiers of the cavalry soldier corps are caused to fall in according to the falling-in order values which were stored in the RAM in step 206 shown in FIG. 5. Next, in step 112, a determination is made about whether or not an interruption has occurred by judging whether or not a vertical blanking interruption processing which is called once at a period of 1/60 seconds (about 16.6 milliseconds) has been performed according to a vertical blanking interval. When negative determination is made in step 112, a main processing such as a processing executed on the inputted information, for example, view point changing information, which is transmitted from the input receiving section 21, a processing for causing the sound processing section 24 to compose game sound-effects and the like, is performed in subsequent step 116, and the routine proceeds to step 118.

Figure 6:
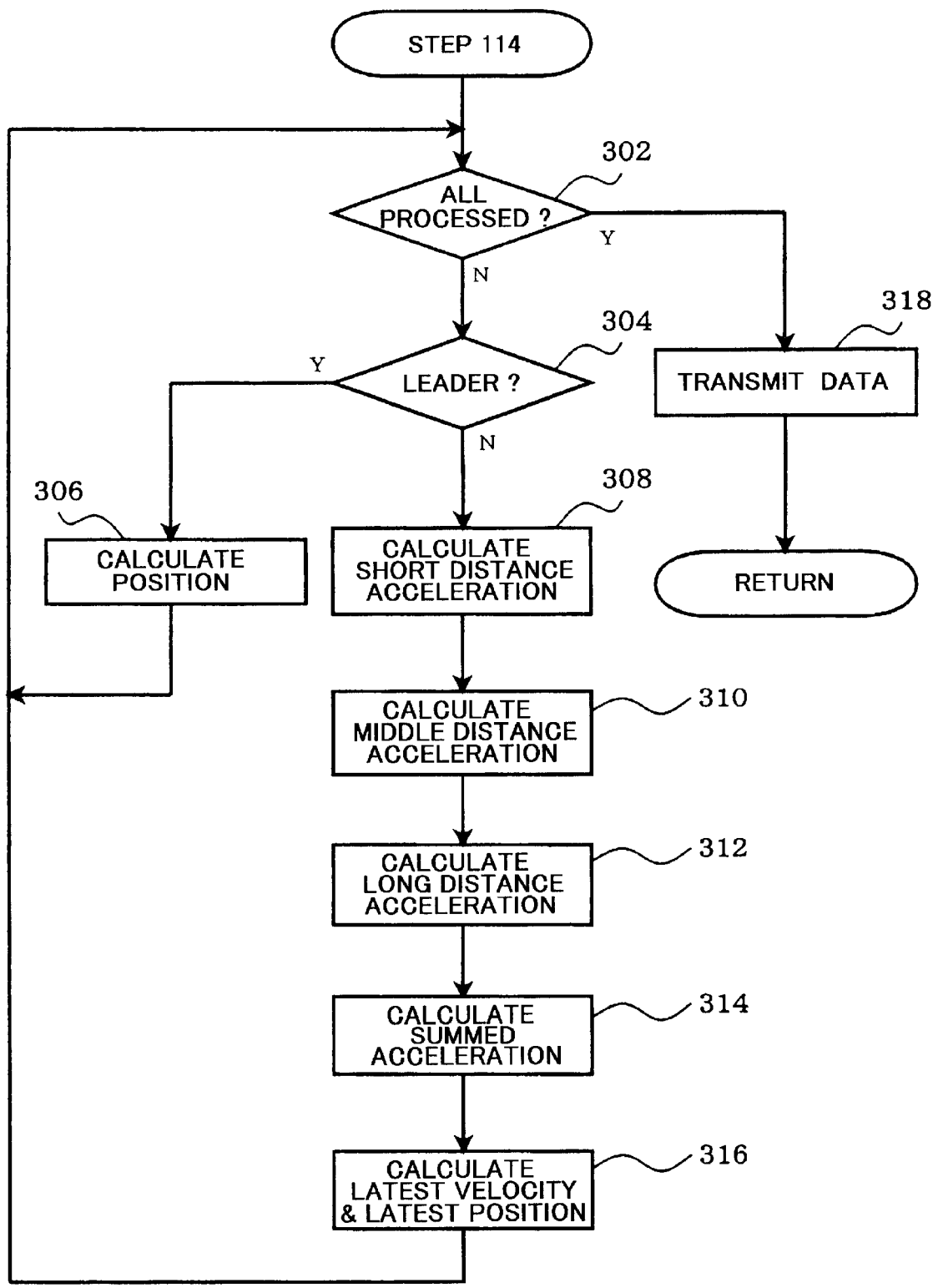
FIG. 6 is a flowchart of a corps movement processing subroutine showing the details of step 114 of the cavalry soldier corps movement routine.

On the other hand, when affirmative determination is made in step 112, a corps movement processing subroutine for moving the cavalry soldier corps from the falling-in position towards the target position is carried out within the interruption processing time 1/60 seconds. As shown in FIG. 6, in the corps movement processing subroutine, a latest position for each of all the cavalry soldiers of the cavalry soldier corps including the leader is calculated and, after completion of the calculation of the positions for all the soldiers, the latest position information for all the soldiers is transmitted to the image processing section 23.

First, in step 302, a determination is made about whether or not all the cavalry soldiers were processed. When negative determination is made, a determination is made about whether or not the object to be processed is the leader in step 304.

Figure 13A:
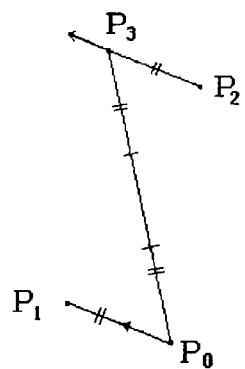
FIG. 13A is an explanatory diagram for explaining control points of Bezier curve.
Figure 13B:
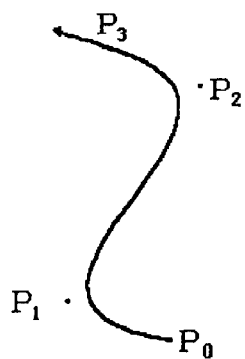
FIG. 13B is an explanatory diagram for explaining the Bezier curve.

When affirmative determination is made, a Bezier curve which is a locus on which the leader traces between the falling-in point and the target point is calculated and the latest position of the leader moving on the Bezier curve is computed. Here, a Bezier curve consisting of four control points is described. As shown in FIG. 13A, when a falling-in point $P_0$ and a target point $P_3$ are given, a segment from the falling-in point $P_0$ to the target point $P_3$ is divided into three equal parts. Points $P_1$ and $P_3$ are respectively set in a direction of the falling-in point $P_0$ and in a direction opposed to a rushing angle direction of the target point $P_3$ such that respective distances are equal to the divided segment. As shown in FIG. 13B, the Bezier curve is formed with a smooth curve whose details will be described below.

A position vector R(S) expressing a position on the Bezier curve consisting of four control points ($P_0$, $P_1$, $P_2$, $P_3$) generally is given by the following Equation (1), a Bezier parameter S ($0 \leq S \leq 1$) being defined as a relative position when the entire Bezier curve calculated from the four points is given as 1.

$$R(S) = (1-S)^3 P_0 + 3S(1-S)^2 P_1 + 3S^2(1-S)P_2 + S^3 P_3 \quad (1)$$

In a case of a three-dimensional coordinate system, the above Equation (1) may be obtained for each of x, y and z coordinates and, therefore, the position vector can be obtained from the following Equations (2).

$$\left. \begin{array}{l} R_x(S) = (1-S)^3 P_{0x} + 3S(1-S)^2 P_{1x} + 3S^2(1-S)P_{2x} + S^3 P_{3x} \\ R_y(S) = (1-S)^3 P_{0y} + 3S(1-S)^2 P_{1y} + 3S^2(1-S)P_{2y} + S^3 P_{3y} \\ R_z(S) = (1-S)^3 P_{0z} + 3S(1-S)^2 P_{1z} + 3S^2(1-S)P_{2z} + S^3 P_{3z} \end{array} \right\} \quad (2)$$

When the Bezier curve is represented by R, since the Bezier curve R comprises a string of points of the position vector R(S) from the above Equation (1) (or the Equation (2)) and the Bezier parameter S gradually increases from 0 to 1 according to an increase of time t, the Bezier curve R can be represented by the function of time t in such a manner as R=R (S (t)).

When the Bezier curve R is assumed to be a distance, a velocity vel (t) can be obtained by differentiating the Bezier curve with respect to time t. Also, the velocity vel(t) is given according to the Chain Rule by the following Equation (3). Further, the Equation (3) can be transformed to obtain Equation (4).

$$vel(t) = \frac{d}{dt} R(S(t)) = \frac{dR}{dS} * \frac{dS}{dt} \quad (3)$$

$$\therefore \frac{dS}{dt} = \frac{vel(t) \cdot \frac{dR}{dS}}{\left|\frac{dR}{dS}\right|^2} \quad (4)$$

The denominator of the right side of the Equation (4) is the inner product of the position vector itself, and the velocity vel(t) with an initial value 0 can be obtained sequentially in each vertical blanking interruption processing according to the Euler method described later. The dt in the above Equations is the time interval of the vertical blanking interruption processing and is 1/60 seconds as described above. Also, the dR/dS is a vector (x, y, z) obtained by differentiating the above Equation (2) with respect to S once. Accordingly, since the dS can be obtained finally, the position of the leader on the Bezier curve can be computed. Thereby, a state in which the leader moves on the locus of the Bezier curve for each interruption processing is displayed on the television monitor 4. This moving state will be explained further in detail with reference to FIG. 17. The four control points are a falling-in point 1101, a point 1109, a point 1108, and a target point 1103, and the Bezier curve is a curve 1102. A leader 903 moves on the Bezier curve 1102 towards the target point 1103 every interval of interruption processing. Incidentally, the calculation of the control points is performed again when the falling-in point or the target point is changed. In step 306, after computation of the latest position of the leader, the corps movement processing subroutine returns to step 302.

On the other hand, when negative determination is made in step 304, for the purpose of avoiding of contact/collision of a cavalry soldier with other cavalry soldiers, short distance acceleration calculation for obtaining acceleration as a first acceleration generated in order for the cavalry soldier to move away from the other cavalry soldiers is performed in subsequent step 308. In this short distance acceleration calculation, first, the short distance perception angle and the short distance perception radius fetched in step 218 in FIG. 5 are read out. Here, the short distance perception angle is defined as an angle of a short distance (neighborhood) visual range visible with a current face orientation for each cavalry soldier, and, as shown in a region 801 in FIG. 11, 190° is set as the default value in this embodiment. Also, the short distance perception radius is defined as a neighborhood distance which every cavalry soldier can get a view of the short distance perception angle, and, as shown in the region 801 in FIG. 11, 3 m (meters) is set as the default value in this embodiment. Next, the positions of other cavalry soldiers which were stored to the RAM in the previous vertical blanking interruption processing (before 1/60 seconds) are read out, and a determination is made about whether or not the another cavalry soldier exists within a short distance region which is a first region defined both by the short distance perception angle and the short distance perception radius.

Figure 14:
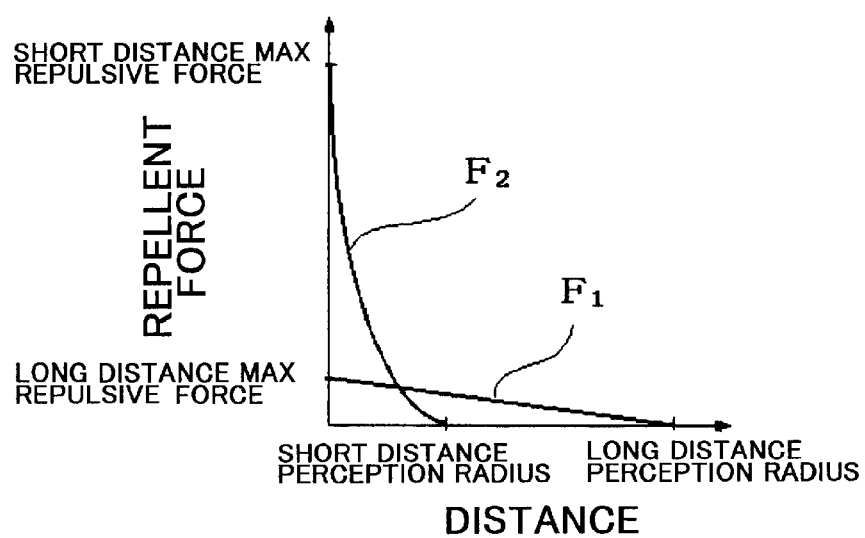
FIG. 14 is an explanatory graph showing a relationship between a repulsive force and a distance in a short distance region and in a long distance region.

When another cavalry soldier exists in the region, a distance between the cavalry soldier and the another cavalry is obtained and a repulsive force corresponding to the distance is obtained. As mentioned above, since the cavalry solder must avoid contact/collision with the another cavalry solder in the short distance, it is preferable that, when the another solder gets close to the cavalry soldier, the cavalry soldier moves away from the anther cavalry soldier rapidly. Therefore, as shown in FIG. 14, assuming that a repulsive force is set to the axis of ordinates and a distance is set to the axis of abscissas, a relationship between the distance and the repulsive force is to change such that, when the distance is short (close), the repulsive force increases sharply like a quadratic function $F_2$, for example. Accordingly, when the distance is 0, the repulsive force becomes a value of the short distance maximum repulsive force which is given in the region 801 shown in FIG. 11, and when the distance is equal to the short distance perception radius, the repulsive force becomes 0. The obtained repulsive force is deed as acceleration on an assumption that the obtained repulsive force is divided by the mass of the cavalry soldier (see unit system in region 801 in FIG. 11), and the product of the acceleration and a vector from the another cavalry soldier towards the cavalry soldier is obtained for each of components $\alpha_x, \alpha_y, \alpha_z$ so that the product is defined as short distance acceleration. Then, a determination is made about whether or not another cavalry solder other than the another cavalry soldier exists within the short distance region. When affirmative determination is made, a repulsive force is obtained in the above manner and short distance acceleration is obtained from a obtained repulsive force. Then, the obtained acceleration is added to the previously obtained short distance acceleration for each of components x, y, z to be stored in the RAM as the short distance acceleration, and the subroutine proceeds to step 310.

On the other hand, when another cavalry soldier does not exist within the short distance region, the repulsive force is 0 like the case that the distance is equal to the short distance perception radius. Therefore, each of the components $\alpha_x, \alpha_y, \alpha_z$ of the short distance acceleration is stored in the RAM as 0, and the subroutine proceeds to step 310.

In step 310, middle distance acceleration calculation for obtaining acceleration as a second acceleration generated in order for the cavalry soldier to maintain the same speed as those of neighborhood cavalry solders is performed. In this middle distance acceleration calculation, first, the middle distance perception angle and the middle distance perception radius fetched in step 218 are read out. Here, the middle distance perception angle is defined as an angle of a middle distance visual range visible with a current face orientation for each cavalry soldier, and, as shown in a region 802 in FIG. 11, 170° which is smaller than the short distance perception angle is set as the default value in this embodiment. Also, the middle distance perception radius is defined as a distance that every cavalry soldier can get a view of the middle distance perception angle, and, as shown in the region 802 in FIG. 11, 7 m which is longer than the short distance perception radius is set as the default value in this embodiment. Next, the positions of other cavalry soldiers stored to the RAM in the previous vertical blanking interruption processing (before 1/60 seconds) are read out, and a determination is made about whether or not the another cavalry soldier exists within a middle distance region which is a second region defined both by the middle distance perception angle and the middle distance perception radius.

When another cavalry soldier does not exist within the middle distance region, first, the directional vector (x, y, z) towards the leader is obtained in order for the cavalry soldier to pursue the leader at the maximum velocity. Here, the directional vector (x, y, z) is a unit vector whose degree of magnitude (scalar) has no meanings but only whose direction has meaning. The directional vector (x, y, z) towards the leader can be obtained by calculating a difference between the position (x, y, z) of the leader and the position (x, y, z) of the cavalry soldier to produce a unit vector thereof. Next, acceleration of the cavalry soldier is calculated according to the following Equation (5), and a position thereof is calculated according to the Euler method to store them in the RAM. Then, the subroutine proceeds to step 312.

Acceleration $(x, y, z)$={(Directional Vector $(x, y, z)$ to leader× Maximum Velocity)–Current Velocity $(x, y, z)$}/Velocity-Equalizing Time Parameter (5)

On the other hand, when other cavalry soldiers exist within the middle distance region, acceleration of each cavalry soldier for matching with an average velocity of the other cavalry soldiers existing within the middle distance region is calculated according to the following Equations (6a), (6b) and a position thereof is calculated according to the Euler method described later to store them in the RAM. Then, the subroutine proceeds to step 312. Incidentally, in the Equations (6a), (6b), the velocity-equalizing time parameter is a time parameter used for obtaining acceleration from the moving velocity, and in this embodiment its default value is about 0.3 seconds (see region 804 in FIG. 11).

Average Velocity $(x, y, z)$=(Sum of Velocities of Cavalry Soldiers within. Middle Distance Region)/(Number of Cavalry Soldiers within Middle Distance Region) (6a)

Acceleration (x, y, z)={Average Velocity (x, y, z)−Current Velocity (x, y, z)}/Velocity-Equalizing Time Parameter (6b)

In step 312, long distance acceleration calculation for obtaining acceleration as a third acceleration generated in order for the cavalry soldier to change an advancing direction to get an unobstructed view so as to avoid contacting with the cavalry soldiers positioned in the long distance in the advancing direction of the cavalry soldier is performed. In this long distance acceleration calculation, first, the long distance perception angle and the long distance perception radius fetched in step 218 are read out. Here, the long distance perception angle is defined as an angle of a distant visual range when the cavalry soldier moves forward, and 30° which is smaller than the middle distance perception angle is set as the default value in this embodiment, as shown in a region 803 in FIG. 11. Also, the long distance perception radius is defined as a distance that the cavalry soldier can get a view of the long distance perception angle, and, as shown in the region 803 in FIG. 11, 15 m which is longer than the middle distance perception radius is set as the default value in this embodiment. Next, the positions of other cavalry soldiers stored to the RAM in the previous vertical blanking interruption processing are read out, and a determination is made about whether or not another cavalry soldier exists within the long distance region which is a third region defined both by the long distance perception angle and the long distance perception radius.

When another cavalry soldier exists within the long distance region, the distance between the cavalry soldier and the another cavalry soldier is obtained and a repulsive force corresponding to the distance is obtained. In the long distance, since it is unnecessary to move the cavalry soldier rapidly away from the another cavalry soldier unlike the short distance, as shown in FIG. 14, assuming that a repulsive force is set to the axis of ordinates and a distance is set to the axis of abscissas, a relationship between the distance and the repulsive force is to change like a linear function $F_1$, for example. Accordingly, when the distance is 0, the repulsive force becomes a value of the long distance maximum repulsive force which is given by the region 803 shown in FIG. 11, and when the distance is equal to the long distance perception radius, the repulsive force becomes 0. The product of the obtained repulsive force (deemed as acceleration) and a vector from the another cavalry soldier towards the cavalry soldier is obtained for each of components x, y, z so that the product is defined as long distance acceleration. Then, a determination is made about whether or another cavalry solder other than the another cavalry soldier exists within the long distance region. When affirmative determination is made, a repulsive force is obtained in the above manner and the long distance acceleration is obtained from the obtained repulsive force. Then, the obtained acceleration is added to the previously obtained long distance acceleration for each of components x, y, z to be stored in the RAM as the long distance acceleration, then, the subroutine proceeds to step 314.

On the other hand, when another cavalry soldier does not exist within the long distance region, the repulsive force is 0 like the case that the distance is equal to the long distance perception radius. Therefore, each of the components $\alpha_x$, $\alpha_y$, $\alpha_z$ of the long distance acceleration is stored in the RAM as 0, and the subroutine proceeds to step 314.

In step 314, the short distance acceleration, the middle distance acceleration and the long distance acceleration are read out and they are added for each of components x, y, z to obtain summed acceleration. In subsequent step 316, the latest velocity and the latest position of the cavalry soldier are calculated and then stored to the RAM. Then, the subroutine returns to step 302. Here, assuming that current time is t, elapsed time is $\delta_t$, velocity is V ($V_{t+\delta t}$: velocity at time t+δt, $V_t$: velocity at time t), acceleration is α ($\alpha_t$: acceleration at time t), and position is P ($P_{t+\delta t}$: position at time t+δt, $P_t$: position at time t), the latest velocity and the latest position can be obtained in accordance with the equation of motion using the Euler method as shown with the following Equations (7).

$$\left.\begin{array}{l} V_{t+\delta t} = V_t + \alpha_t \delta_t \\ P_{t+\delta t} = P_t + V_t \delta_t + 0.5 \alpha_t \delta_t^2 \end{array}\right\} \quad (7)$$

Accordingly, the latest velocity and the latest position can be obtained from the Equations (7) as the latest velocity =the previous velocity+elapsed time×acceleration, and the latest position=the previous position+elapsed time×(velocity+ 0.5×elapsed time×acceleration). In the three-dimensional coordinate system of this embodiment, as shown with the following Equations (8), the latest acceleration is obtained for each component of the three-dimensional coordinate axes x, y, z, every time when the interruption processing is performed, and the latest velocity and the latest position are calculated, so that the values of the latest velocity and the latest position are stored in the RAM (hereinafter, explanation about storing the latest velocity and the latest position in the RAM is omitted).

$$\left.\begin{array}{l} V_{t+\delta tx} = V_{tx} + \alpha_{tx} \delta_t \\ P_{t+\delta tx} = P_{tx} + V_{tx} \delta_t + 0.5 \alpha_{tx} \delta_t^2 \\ V_{t+\delta ty} = V_{ty} + \alpha_{ty} \delta_t \\ P_{t+\delta ty} = P_{ty} + V_{ty} \delta_t + 0.5 \alpha_{ty} \delta_t^2 \\ V_{t+\delta tz} = V_{tz} + \alpha_{tz} \delta_t \\ P_{t+\delta tz} = P_{tz} + V_{tz} \delta_t + 0.5 \alpha_{tz} \delta_t^2 \end{array}\right\} \quad (8)$$

When affirmative determination is made in step 302, that is, the positions of all the cavalry solders of the cavalry soldier corps were calculated, data of the latest positions of all the cavalry soldiers is transmitted to the image processing section 23, and the corps movement processing subroutine by interruption ends, and the routine proceeds to step 118 in FIG. 4.

Figure 15B:
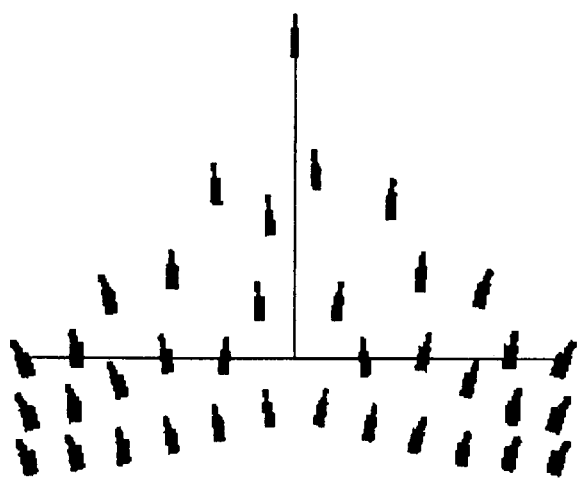
Figure 15C:
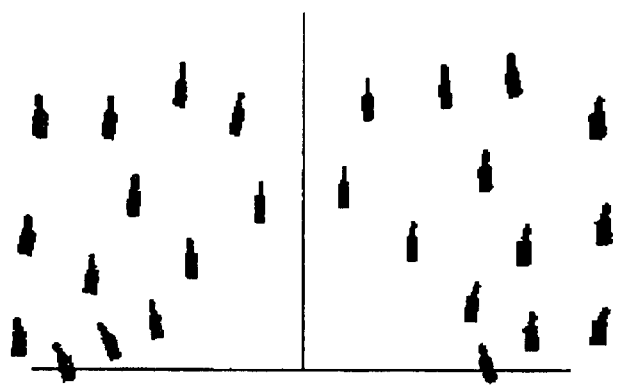
Figure 16A:
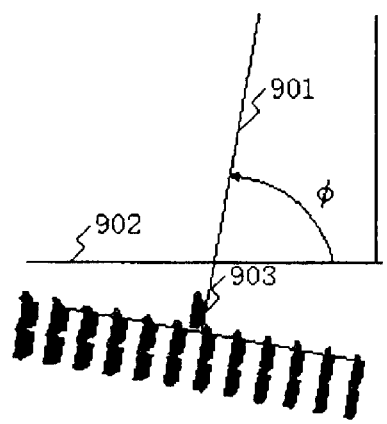
FIGS. 16A, 16B and 16C are respectively explanatory diagrams showing other movement states of the cavalry soldier corps displayed on the television monitor, where
Figure 16B:
Figure 16C:
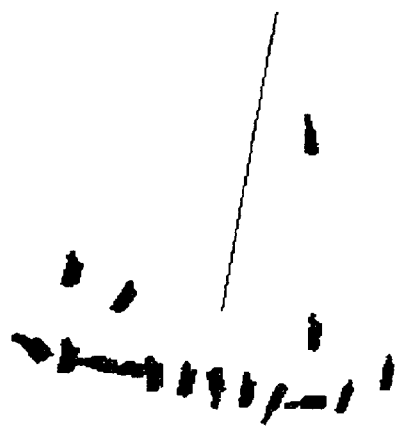

Thus, the moving state of the cavalry soldier corps is displayed on the television monitor 4 for every interval of 1/60 seconds. The state of the corps movement will be explained with reference to FIGS. 15A, 15B and 15C showing a two-dimensional space for simplification of explanation. The leader 903 is set such that the leader's position: (x, y)=(0, 0), the leader's orientation φ: 90°, the target point: (x, y)=(0, 150), and the rushing angle: 90° FIG. 15A shows a state in which the cavalry soldiers of the cavalry soldier corps fall in. When the leader 903 moves, first, cavalry soldiers just behind the leader follow the leader as if they noticed the leader's movement. The cavalry soldiers positioned in a rear region of the corps can not move immediately because they are still crowded, so that they are put in a standby state in a slightly spreading manner (FIG. 15B). When the number of cavalry soldiers around each soldier decreases, respective cavalry soldiers move in a spread (deployed) state (FIG. 15C). Accordingly, when the player watches the state of movement of the cavalry soldier corps displayed on the television monitor 4, each cavalry soldier seems to move on the basis of his/her independent judgement according to the set values such as the perception angle, the perception radius, the maximum repulsive force and the like. Also, FIGS. 16A, 16B and 16C show each state of the cavalry soldier corps moving in this order displayed on the television monitor 4, where the leader is set such that the leader's position: (x, y)=(−20, −10), the leader's orientation φ: 80°, the target point: (x, y)=(20, 200), and the rushing angle: 80°.

In step 118 shown in FIG. 4, a determination is made about whether or not the leader has reached the target point by judging whether or not the leader has entered in the scope of the target point radius. When negative determination is made, the routine returns to step 112 so that the movement of the cavalry soldier corps advances as described. When affirmative determination is made, the routine proceeds to step 119, where k functioning as a flag is set to 0 as described later. In subsequent step 120, a determination is made about whether or not an interruption has occurred by judging whether or not a vertical blanking interruption processing which is called for each 1/60 seconds (about 16.6 milliseconds) due to the vertical blanking interval has been performed in the same manner as step 112. When negative determination is made in step 120, the main processing in the same manner as step 116 is performed in step 122, and the routine proceeds to step 126. On the other hand, when affirmative determination is made in step 120, a wandering processing subroutine where all the cavalry soldiers of the corps wander about around the target point is performed within 1/60 seconds caused by the interruption.

Figure 7:
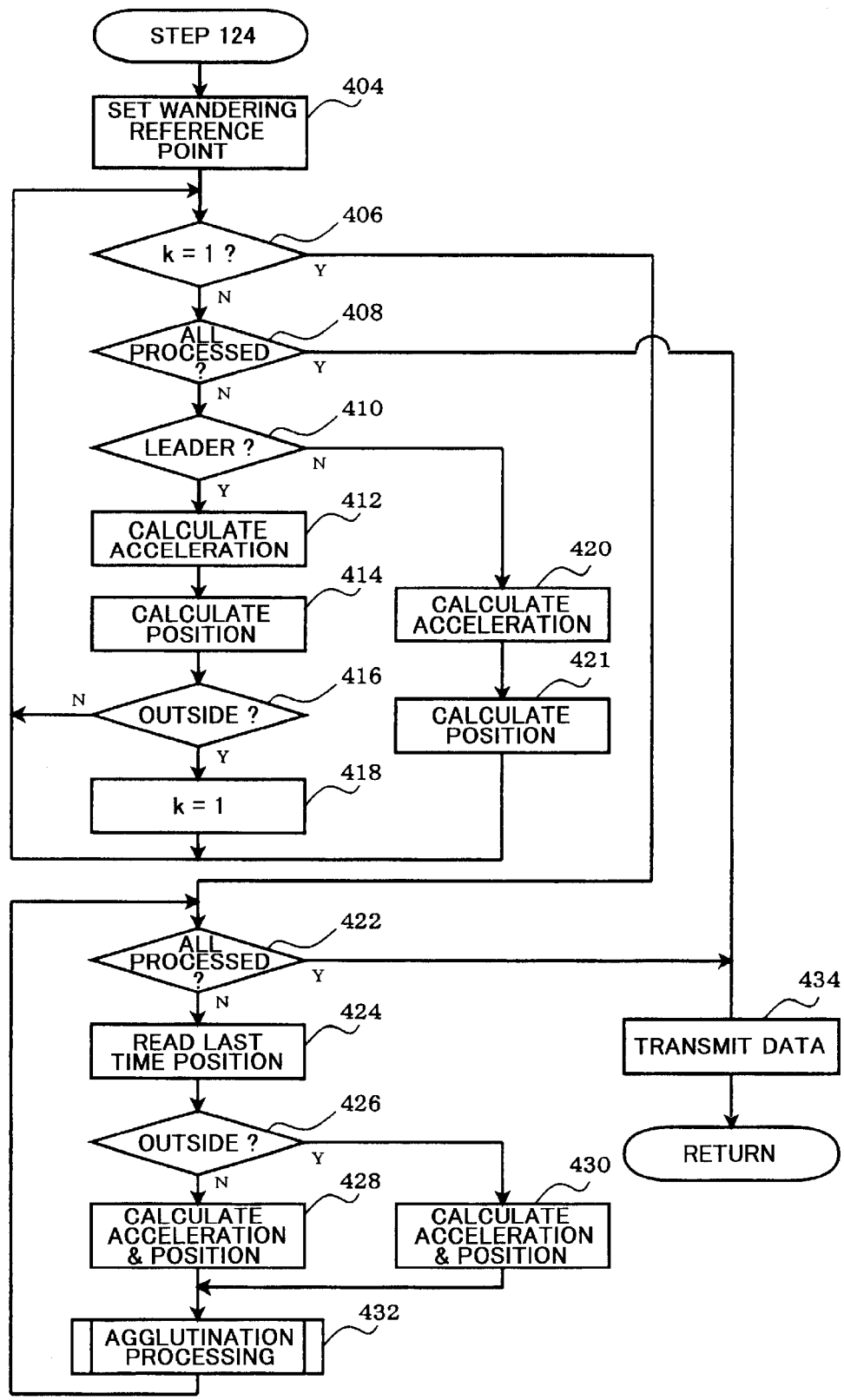
FIG. 7 is a flowchart of a wandering processing subroutine showing the details of step 124 of the cavalry soldier corps movement routine.

As shown in FIG. 7, in this wandering processing subroutine, first, in step 404, a wandering reference point is set for each of all the cavalry soldiers. The wandering reference point will be explained with reference to FIG. 17. The wandering reference point of each cavalry soldier is an arbitrary point within a wandering circle 1105 defined by a wandering radius 1107 centering the target point 1103 and it is selected for each cavalry soldier at random so as not to overlap each wandering reference point of other cavalry soldiers. In subsequent step 406, a determination is made about whether or not k is 1. When affirmative determination is made, the subroutine proceeds to step 422, and when negative determination is made, a determination is made about whether or not processing for all the cavalry soldiers has been completed in step 408. When negative determination is made in step 408, a determination is made about whether or not the object to be processed is the leader in subsequent step 410.

When affirmative determination is made in step 410, acceleration is calculated in accordance with the following Equation (9) in step 412, and then summed acceleration is calculated by adding each of components x, y, z of short distance acceleration obtained in the same manner as step 308, and current self directional vector is stored in the RAM. In subsequent step 414, the latest position is calculated according to the Euler method described above.

Acceleration $(x, y, z) = \{$(Current Self Directional Vector $(x, y, z)$×Wandering Time Velocity)−Current Velocity $(x, y, z)\}$/Velocity-Equalizing Time Parameter (9)

In the next step 416, a determination is made about whether or not the latest position of the leader calculated in step 414 is outside the wandering circle. When negative determination is made, the subroutine returns to step 406. On the other hand, when affirmative determination is made, 1 is set to k in subsequent step 418, and the subroutine returns to step 406. The "k" is a flag giving whether or not all the soldiers of the corps are put in the wandering state. Once the leader goes outside the range of the wandering circle, the flag k is changed from 0 to 1 and all the solders of the cavalry corps are put in the wandering state.

When the determination in step 410 is negative, acceleration is calculated in step 420 in the same manner as step 412, and the directional vector is stored. In step 421, the latest position is calculated and the subroutine returns to step 406.

On the other hand, when affirmative determination is made in step 408, since the processing for all the soldiers of the corps has been completed, data of the latest positions of all the soldiers is transmitted to the image processing section 23 in step 434, and the wandering processing subroutine ends, and then the routine proceeds to step 126 in FIG. 4. Thereby, as shown in FIG. 17, when the leader 903 reaches the wandering circle 1104 at the predetermined rushing angle, the leader 903 moves at the acceleration for matching with the wandering time velocity in an extending in which the leader 903 rushed towards the wandering circle 1104 at the predetermined angle as shown with a locus 1110. And, the cavalry soldiers following the leader move at acceleration for matching with the wandering time velocity.

Next, in step 422, a determination is made about whether or not all the cavalry soldiers of the cavalry soldier corps have been processed. When negative determination is made, the position of the cavalry soldier to be processed which was stored last time in the RAM is read out in subsequent step 424, and a determination is made about whether or not the cavalry soldier to be processed exists outside the wandering circle in the next step 426. When negative determination is made, acceleration is calculated in subsequent step 428 in the same manner as step 412, and the position is further calculated in accordance with the Euler method to store the current directional vector in the RAM. Then, the subroutine proceeds to step 432. When affirmative determination is made, acceleration of each cavalry soldier for entering in the wandering circle towards the wandering reference point at the maximum speed is calculated and the position thereof is calculated according to the Euler method in step 430. Then, the routine proceeds to step 432. In the calculation of the acceleration in step 430, first, a difference between the wandering reference point (x, y, z) and the current position (x, y, z) is obtained to calculate the directional vector, and the acceleration is calculated according to the following Equation (10). Next, this acceleration is added with the short distance acceleration in the same manner as step 308 for each of components x, y, z to calculate summed acceleration.

Acceleration $(x, y, z) = \{$(Current Self Directional Vector $(x, y, z)$×Maximum Velocity)−Current Velocity $(x, y, z)\}$/Velocity-Equalizing Time Parameter (10)

Figure 18A:
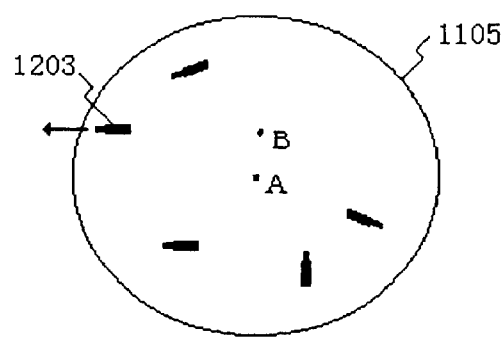
FIGS. 18A and 18B are explanatory diagrams for explaining wandering states of cavalry soldiers of the cavalry soldier corps after the cavalry soldier corps is put in a wandering state, where
Figure 18B:
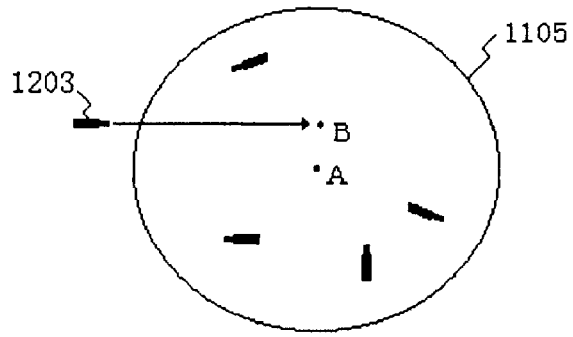

Thereby, as shown in FIG. 18A, a cavalry soldier 1203 wanders about within the wandering circle 1105 at a slow speed. As shown in FIG. 18B when the cavalry soldier 1203 went outside the wandering circle 1105 last time, the cavalry soldier 1203 tries to return towards a wandering reference point B set for the cavalry soldier in step 404 at the maximum speed until he/she enters inside the wandering circle 1105. Accordingly, in the wandering state, each cavalry soldier of the cavalry soldier corps generally moves at a slow speed within the wandering circle.

Figure 8:
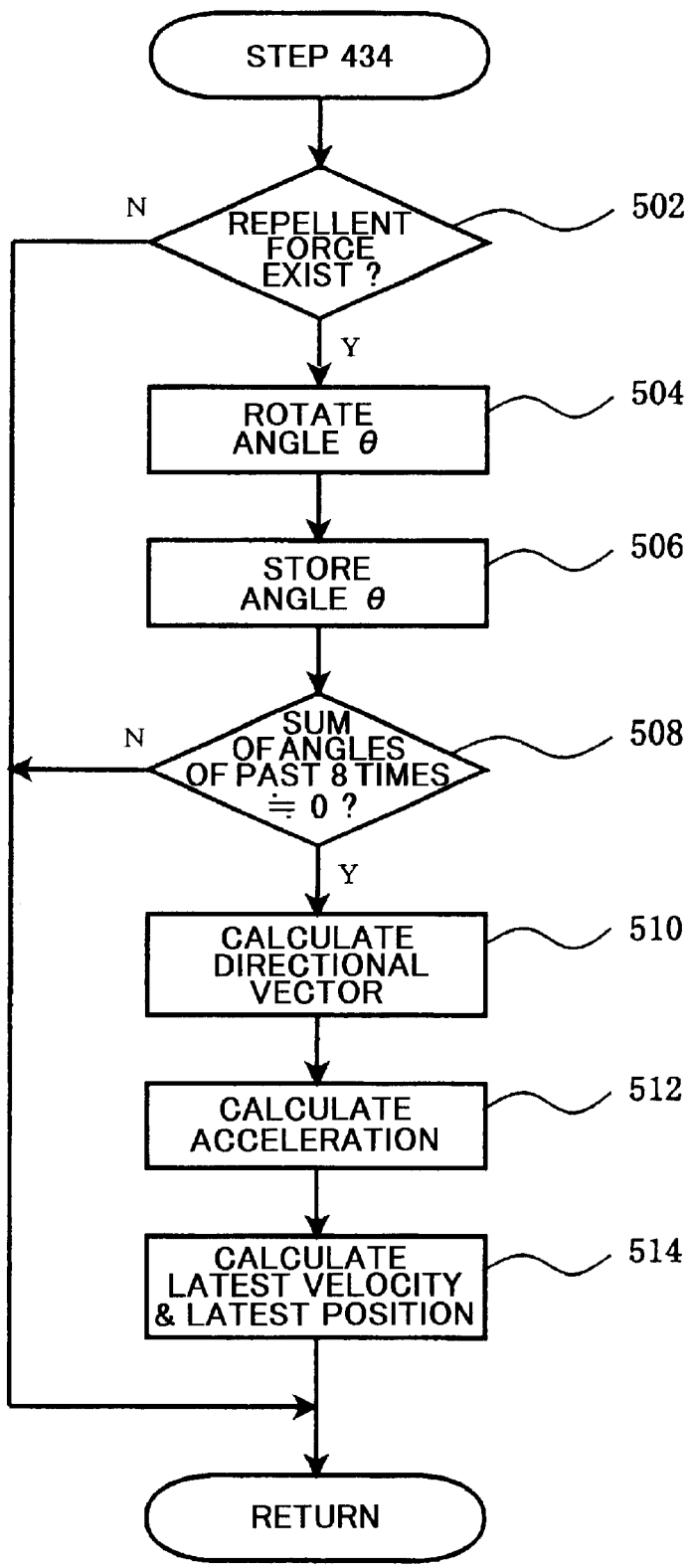
FIG. 8 is a flowchart of an agglutination processing subroutine showing the details of step 432 of the wandering processing subroutine.
Figure 19A:
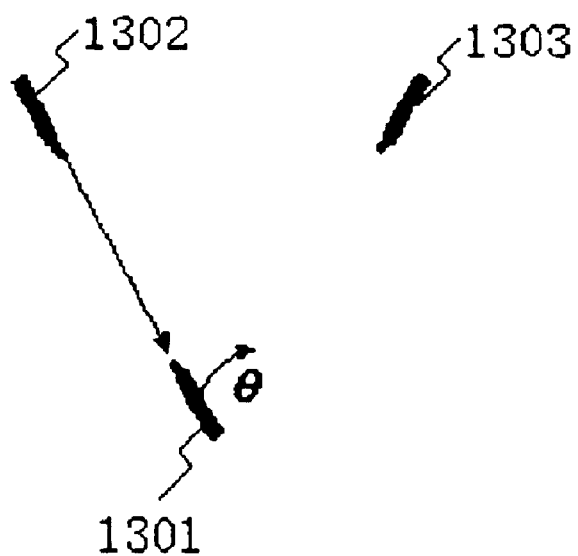
FIGS. 19A and 19B are explanatory diagrams for explaining agglutinated states of cavalry soldiers, where

In the next step 432, an agglutination processing subroutine shown in FIG. 8 is performed. In this agglutination processing subroutine, for example, as shown in FIG. 19A, a processing for a case in which a cavalry soldier 1302 existing within the short distance region of a cavalry soldier 1301 tries to advance in the direction of the cavalry soldier 1301 straightly, namely, for a case in which the cavalry soldier 1301 is subjected to a repulsive force from its front, is performed.

Figure 19B:
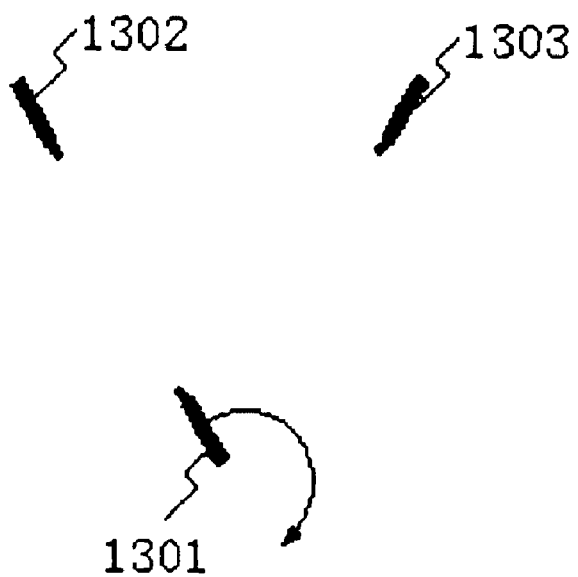

As shown in FIG. 8, in the agglutination processing subroutine, first, in step 502, a determination is made about whether or not there is a repulsive force acting on the cavalry soldier to be processed from anther cavalry soldier existing within the short distance region. When negative determination is made, the agglutination processing subroutine ends and the wandering processing subroutine returns to step 422 in FIG. 7. When affirmative determination is made, the (each) cavalry soldier is rotated by an angle θ in subsequent step 504, the rotation angle θ and the unit vector whose direction corresponds to the rotation angle θ as a directional vector are stored in the RAM in step 506, and the cavalry soldier 1301 tries to advance in the direction of the rotation angle θ. However, as shown in FIG. 19A, when a cavalry soldier 1303 having a repulsive force acting on the cavalry soldier 1301 exists in the direction in which the soldier 1301 has been rotated by the rotation angle θ, the cavalry soldier 1301 can not advance, because the short distance repulsive force acts on the cavalry soldier 1301, and the cavalry soldier 1301 is caused to rotate by an angle−θ in the next vertical blanking interruption so that the cavalry soldier 1301 is made immovable. Therefore, in subsequent step 508, a determination is made about whether or not the cavalry soldier is put in the agglutinated state, namely, he/she is put in an immovable state by judging whether or not the sum total of the angles stored in the RAM in the vertical blanking interruptions of the past eight times including the current interruption is nearly 0. When it is determined that the cavalry soldier is not put in the agglutinated state, the agglutination processing subroutine ends, and the wandering processing subroutine returns to step 422 in FIG. 7. When it is determined that the cavalry soldier is put in the agglutinated state, in subsequent step 510, differences in coordinates between the cavalry soldier and all the other soldiers existing within the short distance region are obtained, and the unit vectors each formed in the directional vector are calculated regarding the respective differences to obtain the sum thereof. Further, the vector of the obtained sum is formed in the directional vector by transforming the summed vector into a unit vector, and the directional vector is set as the directional vector (x, y, z) of the cavalry soldier. Thereby, as shown in FIG. 19B, since the cavalry soldier 1301 changes his/her advancing direction, he/she can escape from the agglutinated state with the other cavalry soldiers 1302, 1303 so that the game proceeds. In subsequent step 512, acceleration is obtained by multiplying the directional vector (x, y, z) calculated in step 510 by the maximum acceleration, and the latest velocity and the latest position are obtained according to the Euler method in step 514. Thus, the agglutination processing subroutine ends and the subroutine returns to step 422 in FIG. 7.

When affirmative determination is made in step 422 in FIG. 7, data of the latest positions is transmitted to the image processing section 23 in step 434 and the wandering processing subroutine ends, and then the routine proceeds to step 126 in FIG. 4.

In step 126, a determination is made about whether or not a falling-in order for causing the cavalry soldiers to fall in from the wandering state is received from the inputting device 3. When negative determination is made, the routine returns to step 120. When affirmative determination is made, in subsequent step 128, a dialog shown in FIG. 12 is displayed on the television monitor 4, for example. In the next step 130, the routine is maintained in a standby state until the OK button is pressed by the player while the leader's orientation is maintained at the default value or changed according to his/her intention. When the button is pressed down, the leader's orientation is fetched in step 132, and in the next step 134 all the cavalry soldiers of the cavalry soldier corps are caused to fall in and the cavalry soldier corps movement routine ends. Incidentally, the falling-in point is set as the target point fetched in step 212 unless the target order is changed (since the dialog in FIG. 10 can be called at any time, it is possible to change the target point).

In the embodiment described above, since each cavalry soldier of the cavalry soldier corps follows the leader with the summed acceleration obtained by adding the short distance acceleration for moving away from other cavalry soldiers when each cavalry soldier gets too close to other cavalry soldiers, the middle distance acceleration for matching the running speed and the direction with those of other cavalry soldiers around him/her and the long distance acceleration for changing the advancing direction to have the unobstructed view, each cavalry soldier never looks like a behavior merely following the leader's movement, but each cavalry soldier appears as if he/she were moving in accordance with his/her own judgement based on the setting values of his/her perception angle, perception radius, the maximum repulsive force and the like while displaying in detail the delicate reciprocal interactions between the cavalry soldier and respective cavalry soldiers which do not follow the leader directly and which exist near the cavalry soldier. For this reason, like a troop (group) of animals such as actual birds, horse or the like, since the cavalry soldiers existing from the middle position of the cavalry soldier corps to the rear position thereof are not moving so as to trail the leader but they are moving while adjusting their speeds and directions to one anther in accordance with the movement of other cavalry soldiers moving around him/her, the action of movement of the cavalry soldier corps can be displayed much more realistically. Therefore, the player can enjoy moving action of the cavalry soldier corps which is displayed on the virtual space with a sense of reality.

Further, in the embodiment, since the wandering reference point is set at random for each cavalry soldier after the cavalry soldier corps reached the target point. When each cavalry soldier is put in the wandering state, he/she wanders about within the wandering circle at the slow velocity. When each cavalry soldier goes outside the wandering circle, he/she returns to the wandering reference point. Accordingly, the state similar to the state in which actual wild horses form the group (troop) can be displayed, and the state in which the cavalry soldier corps is put in a standby state around the target point set for each cavalry soldier until the corps receives another order (falling-in order) can be displayed with reality.

Furthermore, in the embodiment, when the agglutinated state occurs, the cavalry soldier in the agglutinated state rotates to cancel the agglutinated state without moving backward. Therefore, the behavior of a horse that can not move backward can be displayed with reality. As a result, respective actions in the present embodiment can substantially reproduce those of actual animals almost completely.

Incidentally, the embodiment is structured such that the game program recorded on the recording medium 1 is read by the medium reading section 22 and is transmitted to the RAM, but the present invention may be structured such that the game program is stored in the ROM and it is read out therefrom without providing the medium reading section 22. According to this structure, such a device is exclusively used for a game machine. Also, in this embodiment, the example where the CD-ROM is used as the recording medium has been explained. However, the present invention is applicable to a structure where a ROM cartridge, a floppy disk with a mass volume, a magnet-optical disk or the like which can be loaded to the RAM of the CPU block 20 can be used instead and the medium reading section is provided for reading the game program therefrom.

Further, the present embodiment is structured such that the initial setting for the corps movement is performed according to the dialogs. The present invention may be structured such that the initial setting is automatically performed, for example, by using the inputting device 3 to move a cursor displayed on the screen and designating the falling-in position for initiating the movement of the cavalry soldier corps and the like. Moreover, all of the initial setting operations may be automatically performed according to an advancing situation of the game.

Furthermore, the present embodiment is structured such that the acceleration and the position of each cavalry soldier are calculated within interruption processing of the vertical blanking interval performed at the constant intervals, but the present invention may be structured such that the calculations are performed within the timer interruption processing or within the main processing. Also, in this embodiment, the example where the calculation of the latest position is performed according to the Euler method after the summed acceleration was obtained has been explained. However, the present invention may be structured such that the positions are sequentially calculated according to the Euler method for each calculation of the short distance acceleration, the middle distance acceleration and the long distance acceleration.

And, the present invention has been explained with the three-dimensional coordinate axes in this embodiment, but it is applicable to two-dimensional coordinate axes where a value of z axis is set to 0. It will be obvious to those skilled in the art that other various embodiments may be made without departing from the scope of the invention as hereinafter claimed.

What is claimed is:

1. A method for moving grouped characters where a plurality of characters which are displayed on a three-dimensional virtual space and in which a leader is included form a group and the grouped characters are moved towards a predetermined target point, comprising the steps of:

calculating a first acceleration for moving a character away from another character when the another character exists within a predetermined first region for the character, and a second acceleration for matching the character with moving speed and direction of another character which is moving so as to follow the leader when the another character exists within a predetermined second region for the character, respectively; and calculating a position of the character on the three-dimensional virtual space on the basis of summed acceleration obtained by summing the calculated first and second accelerations for each of x, y and z components on the three-dimensional virtual space within a predetermined time.

2. A method for moving grouped characters according to claim 1, wherein the first acceleration changes so as to increase sharply as a distance between the character and the another character becomes small.

3. A method for moving grouped characters according to claim 1, wherein the first and second regions are spheres or circles defined by predetermined vertical angles and predetermined radii centering the character, and the predetermined vertical angle for the first region is larger than that for the second region and the predetermined radius for the former is smaller than that for the latter.

4. A method for moving grouped characters according to claim 1, further comprising a wandering step where the character wanders about within a predetermined region at a predetermined velocity on the basis of predetermined information.

5. A method for moving grouped characters according to claim 4, wherein when the character moves outside the predetermined region, the character moves towards a reference point which is arbitrarily set within the predetermined region at a velocity larger than the predetermined velocity until the character returns within the predetermined region.

6. A method for moving grouped characters according to claim 1, further comprising an agglutinated state canceling step where when the character is agglutinated with another character and put in an agglutinated state in which the character is immovable, an advancing direction of the character is changed so as to cancel the agglutinated state.

7. A method for moving grouped characters according to claim 1, further comprising the step of calculating a third acceleration for moving the character away from another character when the another character exists within a predetermined third region for the character, wherein the calculation of the position of the character on the three-dimensional virtual space is performed on the basis of summed acceleration obtained by summing the calculated first to third accelerations for each of components x, y, z on the three-dimensional virtual space within the predetermined time.

8. A method for moving grouped characters according to claim 7, wherein the first to third regions are spheres or circles defined by predetermined vertical angles or predetermined radii centering the character, the vertical angle for the first region is made larger than that for the second region and the vertical angle for the second region is made larger than that for the third region, and the radius for the first region is made smaller than that for the second and the radius for the second region is made smaller than that for the third region.

9. A method for moving grouped characters according to claim 7, wherein the first acceleration changes so as to increase sharply when a distance between the character and the another character is small, and the third acceleration changes so as to increase at a constant rate when the distance between the character and the another character is small.

10. A method for moving grouped characters according to claim 7, further comprising a wandering step where the character wanders about within a predetermined region at a predetermined velocity on the basis of predetermined information.

11. A method for moving grouped characters according to claim 10, wherein when the character moves outside the predetermined region, the character moves towards a reference point which is arbitrarily set within the predetermined region at a velocity larger than the predetermined velocity until the character returns within the predetermined region.

12. A method for moving grouped characters according to claim 7, further comprising an agglutinated state canceling step where when the character is agglutinated with another character and put in an agglutinated state in which the character is immovable, an advancing direction of the character is changed so as to cancel the agglutinated state.

13. A computer-readable recording medium comprising information that moves grouped characters where a plurality of characters are displayed on a three-dimensional virtual space a leader is included from a group and the groused characters are moved towards a predetermined target point comprising:

information that calculates a first acceleration for moving a character away from another character when the another character exists within a Predetermined first region for the character, and a second acceleration for matching the character with moving speed and direction of another character which is moving so as to follow the leader when the another character exists within a predetermined second region for the character, respectively; and information that calculates a Position of the character on the three-dimensional virtual space on the basis of summed acceleration obtained by summing the calculated first and second accelerations for each of x, y and z components on the three-dimensional virtual space within a Predetermined time.

14. The computer-readable recording medium of claim 13, further comprising:

information that calculates a third acceleration for moving the character away from another character when the another character exists within a predetermined third region for the character, wherein the calculation of the position of the character on the three-dimensional virtual space is Performed on the basis of summed acceleration obtained by summing the calculated first to third accelerations for each of component x, y, z on the three-dimensional virtual space within the predetermined time.

15. A game device, where a software which is read from a recording medium by operating an inputting section can be loaded to a storing section, and which is provided with a position calculating section, which is called at a predetermined period, for calculating a position of each character of a group of characters which is moved to a predetermined target point, the group being formed with a plurality of characters including a leader, wherein the position calculating section comprises:

a first acceleration calculator for calculating a first acceleration for moving a character away from another character when the another character exists within a predetermined first region for the character;

a second acceleration calculator for calculating a second acceleration for matching the character with moving speed and direction of another character which is moving so as to follow the leader when the another character exists within a predetermined second region for the character; and a position calculator for calculating a position of the character on a three-dimensional virtual space on the basis of summed acceleration obtained by summing the accelerations calculated by the first and second acceleration calculator for each of x, y and z components on the three-dimensional virtual space.

16. A game device according to claim 15, wherein the first acceleration changes so as to increase sharply as a distance between the character and the another character becomes small.

17. A game device according to claim 15, wherein the first and second regions are spheres or circles defined by predetermined vertical angles and predetermined radii centering the character, and the predetermined vertical angle for the first region is larger than that for the second region and the predetermined radius for the former is smaller than that for the latter.

18. A game device according to claim 15, further comprising a third acceleration calculator for calculating a third acceleration for moving the character away from another character when the another character exists within a predetermined third region for the character, wherein the position calculator calculates the position of the character on the three-dimensional virtual space on the basis of summed acceleration obtained by summing the first to the third accelerations for each of components x, y, z on the three-dimensional virtual space.

19. A game device according to claim 18, wherein the first to third regions are spheres or circles defined by predetermined vertical angles or predetermined radii centering the character, the vertical angle for the first region is made larger than that for the second region and the vertical angle for the second region is made larger than that for the third region, and the radius for the first region is made smaller than that for the second and the radius for the second region is made smaller than that for the third region.

20. A game device according to claim 18, wherein the first acceleration changes so as to increase sharply when a distance between the character and the another character is small, and the third acceleration changes so as to increase at a constant rate when the distance between the character and the another character is small.

* * * * *